United States Patent [19]
Tanaka et al.

[11] Patent Number: 4,678,602

[45] Date of Patent: Jul. 7, 1987

[54] HIGHLY CONDUCTIVE STYRENIC RESIN COMPOSITION

[75] Inventors: Kazunobu Tanaka; Kyozo Mori, both of Himeji, Japan

[73] Assignee: Daicel Chemical Industries, Ltd., Sakai, Japan

[21] Appl. No.: 609,946

[22] Filed: May 14, 1984

[30] Foreign Application Priority Data

May 16, 1983 [JP]  Japan .................................. 58-85211

[51] Int. Cl.⁴ .................. C07C 143/02; C07C 143/16
[52] U.S. Cl. .................................... 252/513; 252/511; 252/512; 525/74
[58] Field of Search ....................... 252/511, 512, 513; 525/285, 74; 524/435, 437, 439, 440, 441

[56] References Cited

U.S. PATENT DOCUMENTS

| | | | |
|---|---|---|---|
| 3,003,975 | 10/1961 | Louis | 252/513 |
| 3,175,991 | 3/1965 | Levine et al. | 252/512 |
| 3,427,264 | 2/1969 | Forster et al. | 524/439 |
| 3,814,703 | 6/1974 | Nakayama et al. | 252/500 |
| 3,867,315 | 2/1975 | Tigner et al. | 252/512 |
| 4,158,031 | 6/1979 | Reuter et al. | 252/512 |

*Primary Examiner*—A. Lionel Clingman
*Assistant Examiner*—John F. McNally
*Attorney, Agent, or Firm*—Flynn, Thiel, Boutell & Tanis

[57] ABSTRACT

A resin composition, which is very highly electroconductive, comprises a vinylaromatic copolymer containing an unsaturated dicarboxylic acid anhydride and a metallic filler. It is also improved in mechanical properties.

9 Claims, No Drawings

HIGHLY CONDUCTIVE STYRENIC RESIN COMPOSITION

BACKGROUND OF THE INVENTION

This invention relates to a highly conductive styrenic resin composition excellent in mechanical properties, especially impact resistance.

Because of their excellent moldability, processability, mechanical strength, and electrical insulating properties, styrene resins such as styrene homopolymers, styrene-based copolymers, rubber-reinforced high-impact polystyrene, and ABS resins (polymers prepared by graft-polymerizing butadiene elastomer or a derivative thereof with both styrene and acrylonitrile monomer) have been used as molding materials in a variety of application fields. On the other hand, for lack of conductivity, they have various problems such as static electricity charging and a trouble caused by electromagnetic waves.

Accordingly, attempts have been made to impart to styrene resin, as in the case of other resins, a high conductivity so as to provide a sufficient effect of shielding electromagnetic waves.

It has been well-known that a resin can be given a high conductivity by filling it with one or more highly conductive fillers such as carbon black, carbon fiber, metal-coated glass fiber, metallic fiber, metal flakes, or metal powder. Among these highly conductive fillers, metallic fillers have widely been used because of their good balance between the cost and the conductivity-imparting abilities.

Imparting a high conductivity to styrene resin has also been performed by filling the resin with a metallic filler. Although a high conductivity can be obtained by filling a conventional styrene resin with a metallic filler, there is a drawback that the mechanical strength, especially impact resistance of the produced highly conductive resin is lowered remarkably as compared with that of the base styrene resin, and therefore improvement of this drawback has been desired.

SUMMARY OF THE INVENTION

As a result of an ardent study to modify styrene resin which is used as a base resin so as to improve the above-mentioned drawback, the inventors of this invention have found that it is possible to improve not only the drawback, but also some of the mechanical properties of the base styrene resin by using, as a base resin, a styrene resin modified with an unsaturated dicarboxylic acid anhydride, that is, a styrene resin copolymerized with an unsaturated dicarboxylic acid anhydride, or a styrene resin composition prepared by blending usual styrene resin such as mentioned above with a certain amount of styrene resin copolymerized with an unsaturated dicarboxylic acid anhydride, and have reached this invention.

Namely, this invention relates to a highly conductive styrene resin composition excellent unsaturated dicarboxylic acid anhydride-copolymerized styrene resin containing 2 to 35% by weight of a copolymerized unsaturated dicarboxylic acid anhydride, or a composition thereof, and a metallic filler.

The object of this invention is to provide a highly conductive styrene resin composition, and the gist of this invention resides in that a styrene resin can be provided with improved mechanical strengths, especially impact resistance, which conventional highly conductive styrene resins have been expected to have, without any adverse effect on its high conductivity.

DETAILED DESCRIPTION OF THE PREFERRED EMBODIMENTS

The above mentioned styrene resin or styrenic resin according to the invention is a polymer obtained from co-polymerization of a vinyl aromatic monomer such as styrene, alpha-methylstyrene, and o-, m- or p-methylstyrene, an unsaturated dicarboxylic acid anhydride and another optional vinyl monomer and/or a rubber-like elastomer. The vinyl aromatic monomer amounts to at least 50% by weight of the components except the unsaturated dicarboxylic acid anhydride. Examples of the unsaturated dicarboxylic acid anhydrides include maleic anhydride and citraconic anhydride. Examples of the vinyl monomers copolymerizable with the vinyl aromatic compound include acrylonbitrile, methacrylonitrile, acrylic acid, its esters, methacrylic acid, and its esters. The rubber-like elastomers are not particularly limited, and may be any of those generally used in the production of high-impact styrene resins.

By the unsaturated dicarboxylic acid anhydride-copolymerized styrene resins or compositions thereof to be used as the base resin in this invention are meant styrene resins copolymerized with an unsaturated dicarboxylic acid anhydride as described above, or compositions prepared by blending conventional styrene resin with a given amount of a styrene resin copolymerized with an unsaturated dicarboxylic acid anhydride, for example, rubberreinforced high-impact styrene/maleic anhydride copolymer resin, or blends prepared by blending styrene/maleic anhydride copolymer resin, or the above high-impact styrene/maleic anhydride copolymer resin with a given amount of an ABS resin or a high-impact polystyrene resin. Here, the unsaturated dicarboxylic acid anhydride-copolymerized, styrene resin or its composition has a copolymerized unsaturated dicarboxylic acid anhydride content of 2 to 35% by weight, preferably 2.5 to 25% by weight. When the unsaturated dicarboxylic acid anhydride content is above 35% by weight, the fluidity of the composition is extremely poor, which is not practical. On the other hand, when the unsaturated dicarboxylic acid anhydride content is below 2% by weight, it is impossible to obtain a desired highly conductive resin composition improved in mechanical strengths, especially impact resistance, which is not suitable.

The metallic fillers to be used in the composition of this invention include those ordinarily used to impart high conductivity to a resin, such as fiber-, flake- or powder-form products obtained from iron, stainless steel, nickel, aluminum, copper, brass, or the like, and are not particularly limited. With respect to the amount of the metallic filler, it is also not particularly limited, and may be an amount necessary to impart a desired conductivity. Further, it is also possible to use a combination of at least two kinds of metallic fillers, and it is possible without any obstruction to use a different kind of filler together with a metallic filler.

The production process of the highly conductive styrene resin composition of this invention will now be described, but it is not different at all from the conventional production process of a highly conductive resin composition. Namely, for example, a base resin is dry-blended with a metallic filler by a common blending method. The resulting blend is melt-blended through a common extruder or the like, and then pelletized. Here, when a metallic fiber is used as the metallic filler, it is possible to decrease the amount of the filler necessary to obtain a conductivity of the same level by taking measures for preventing the metallic fiber from being broken, for example, those including addition of the metallic fiber through a vent port, or modification of the structure of an extruder so as to prevent easy breaking of the metallic fiber in an extruder.

It has been found that the thus-prepared composition of this invention is improved not only in the drawback of a highly conductive styrene resin composition prepared from a conventional styrene resin, i.e., a drawback that the mechanical strengths, especially impact resistance, are remarkably lower than those of the base styrene resin, but also in some of the mechanical properties as compared with those of the base styrene resin.

Those conventional compositions comprising 60 wt. % of usual styrenic resin, such as high impact polystyrene, and 40 wt. % of aluminum filler have an excellent conductivity, for example, a volume resistivity of the order of $10^{-1}$ ohm, they have a drawback that their impact resistances (Izod impact resistance) are as low as about 60% of that of the high-impact polystyrene resin which is used as a base resin. On the other hand, with respect to the highly conductive styrene resin composition according to this invention, it is possible, surprisingly, to retain the impact resistance of the base resin almost entirely without detriment to its high conductivity. Besides, in the composition of this invention, the tensile strength of the composition becomes larger than that of the base resin. On the other hand, a composition which consists of an ABS resin and fiber or flake of aluminum in such an amount as to effect a high conductivity has a smaller tensile strength than the ABS resin itself. This is true also with respect to the flexural strength of a system prepared by using aluminum flakes as the metallic filler. The factors of these effects can be inferred to result from the interaction between highly polar maleic anhydride groups of the base resin (matrix) and the metallic filler, though their details have not been clarified as yet.

The highly conductive styrene resin composition prepared by this invention can be advantageously used in a variety of applications, including those utilizing its high conductivity, such as antistatic materials (conductive earths) or electronic part casings, those utilizing its electrical resistance, such as planar heating elements or electrodes, those utilizing its electromagnetic wave-shielding property, such as computer or TV game housings, and use as heat-radiating resin materials, and structural materials which must have mechanical strength.

This invention will be described in detail with reference to examples, but it is to be understood that this invention is not limited to these examples.

EXAMPLE 1

An unsaturated dicarboxylic acid anhydride-modified resin (hereinafter, abbreviated as resin A) was obtained by graft-copolymerizing 100 parts by weight of a vinyl monomer consisting of 92% by weight of styrene and 8% by weight of maleic anhydride in the presence of 15 parts by weight of a polybutadiene elastomer by gradually adding the maleic anhydride monomer.

60% by weight of the produced resin A was mixed with 40% by weight of aluminum fiber (a product of Aishin Seiki K.K., 90 μm in thickness and 3 mm in length), and the mixture was melt-blended through a single-screw extruder and pelletized. The obtained pellets were molded by an in-line screw type injection machine to prepare test pieces, which were then measured for Izod impact strength and volume resistivity. The Izod impact strength of the resin A itself containing no aluminum fiber was also measured. Table 1 shows the results.

COMPARATIVE EXAMPLE 1

60% by weight of a commercially available high impact polystyrene resin, Toporex HI-855, which is a tradename of Mitsui Toatsu Chemical Inc., was mixed with 40% by weight of the aluminum fiber used in Example 1, and the mixture was formed in the same way as in Example 1 into test pieces, which were then measured for Izod impact strength and volume resistivity. The Izod impact strength of the high-impact polystyrene resin containing no aluminum fiber was also measured. Table 1 shows the results.

EXAMPLE 2

An unsaturated dicarboxylic acid anhydride-modified resin (hereinafter, abbreviated as resin B) was obtained by copolymerizing 85% by weight of styrene with 15% by weight of maleic anhydride by gradually adding the maleic anhydride monomer.

12% by weight of the produced resin B was mixed with 48 wt. % of an ABS resin, Cevian V-500 which is a trademark of Daicel Chemical Industries, Ltd, and 40% by weight of the aluminum fiber used in Example 1, and the mixture was formed in the same way as in Example 1 into test pieces, which were then measured for Izod impact strength and volume resistivity. The Izod impact strength of a composition containing 20% by weight of resin B containing no aluminum fiber and 80% by weight of an ABS resin was also measured. Table 1 shows the results.

COMPARATIVE EXAMPLE 2

60% by weight of the ABS resin used in Example 2 was mixed with 40% by weight of the aluminum fiber used in Example 1, and the mixture was formed. in the way as in Example 1 into test pieces, which were then measured for Izod impact strength and volume resistivity. The Izod impact strength of the ABS resin itself containing no aluminum fiber was also measured. Table 1 shows the results.

TABLE 1

| | Base resin | Maleic anhydride content of base resin (wt. %) | Base resin Izod impact strength ⓐ (kg · cm/cm) | 60 wt. % of base resin + 40 wt. % of aluminum fiber | | |
|---|---|---|---|---|---|---|
| | | | | Izod impact strength ⓑ (kg · cm/cm) | ⓑ/ⓐ × 100 (%) | Volume resistivity (ohm · cm) |
| Example 1 | Resin A | 6.9 | 9.5 | 9.3 | 98 | $1.5 \times 10^{-1}$ |
| Comp. Example 1 | High-impact polystyrene resin | — | 8.5 | 5.1 | 60 | $2.1 \times 10^{-1}$ |
| Example 2 | 20 wt. % of resin B + | 3.0 | 15.7 | 14.5 | 92 | $1.8 \times 10^{-1}$ |

TABLE 1-continued

| | Base resin | Maleic anhydride content of base resin (wt. %) | Base resin Izod impact strength a (kg · cm/cm) | 60 wt. % of base resin + 40 wt. % of aluminum fiber | | |
|---|---|---|---|---|---|---|
| | | | | Izod impact strength b (kg · cm/cm) | $\frac{b}{a} \times 100\ (\%)$ | Volume resistivity (ohm · cm) |
| Comp. Example 2 | 80 wt. % of ABS resin ABS resin | — | 18.7 | 10.8 | 58 | $1.4 \times 10^{-1}$ |

Note:
The Izod impact resistance was measured according to ASTM D-256.

EXAMPLE 3 AND COMPARATIVE EXAMPLE 3

42% by weight of the resin A was mixed with 58% by weight of brass fiber (a product of Aishin Seiki K.K., 60 μm in thickness and 3 mm in length), and the mixture was formed in the same way as in Example 1 into test pieces, which were measured for physical properties. The physical properties of the resin A itself containing no brass fiber were also measured. Tables 2 and 3 show the results.

COMPARATIVE EXAMPLES 4 AND 5

42% by weight of the ABS resin used in Example 2 was mixed with 58% by weight of the brass fiber used in Example 3. The mixture was formed in the same way as in Example 1 into test pieces, which were then measured for physical properties. The physical properties of the ABS resin itself containing no brass fiber were also measured. Tables 2 and 3 show the results.

EXAMPLE 4

52% by weight of the resin A was mixed with 48% by weight of the aluminum fiber used in Example 1, and the mixture was formed in the same way as in Example 1 into test pieces, which were then measured for physical properties. Tables 2 and 3 show the results.

COMPARATIVE EXAMPLE 6

52% by weight of the ABS resin used in Example 2 was mixed with 48% by weight of the aluminum fiber used in Example 1, and the mixture was formed in the same way as in Example 1 into test pieces, which were then measured for physical properties. Tables 2 and 3 show the results.

EXAMPLE 5

60% by weight of the resin A was mixed with 40% by weight of aluminum flakes (a product of Transmet Corporation, 1 mm × 1.4 mm × 25 μm), and the mixture was formed in the same way as in Example 1 into test pieces, which were then measuered for physical properties. Tables 2 and 3 show the results.

COMPARATIVE EXAMPLE 7

60% by weight of the ABS resin used in Example 2 was mixed with 40% by weight of the aluminum flakes used in Example 5, and the mixture was formed in the same way as in Example 1 into test pieces, which were then measured for physical properties. Tables 2 and 3 show the results.

TABLE 2

| | | Measurement item | | | | | |
|---|---|---|---|---|---|---|---|
| | resin composition | Volume resistivity (ohm · cm) | Izod impact strength (kg · cm/cm) | Heat distortion temperature (°C.) | Tensile strength (kg/cm²) | Flexural strength (kg/cm²) | Flexural modulus (kg/cm²) |
| | | — | D-256 | D-648 | D-638 | D-790 | D-790 |
| Comp. Example 3 | Resin A | — | 9.5 | 92 | 320 | 540 | 21700 |
| Comp. Example 5 | ABS resin | — | 18.7 | 85 | 460 | 760 | 24700 |
| Example 3 | 42 wt. % of resin A + 58 wt. % of brass fiber | $7.3 \times 10^{-2}$ | 6.8 | 105 | 520 | 800 | 66300 |
| Comp. Example 4 | 42 wt. % of ABS resin + 58 wt. % of brass fiber | $8.5 \times 10^{-2}$ | 4.8 | 97 | 620 | 970 | 73300 |
| Example 4 | 52 wt. % of resin A + 48 wt. % of aluminum fiber | $2.0 \times 10^{-2}$ | 9.1 | 110 | 460 | 770 | 77100 |
| Comp. Example 6 | 52 wt. % of ABS resin + 48 wt. % of aluminum fiber | $2.1 \times 10^{-2}$ | 10.0 | 99 | 370 | 810 | 77800 |
| Example 5 | 60 wt. % of resin A + 40 wt. % of aluminum flakes | $6.3 \times 10^{-1}$ | 7.3 | 107 | 330 | 580 | 55200 |
| Comp. Example 7 | 60 wt. % of ABS resin + 40 wt. % of aluminum flakes | $4.5 \times 10^{-1}$ | 7.0 | 99 | 260 | 680 | 57000 |

TABLE 3

| Kind of filler | Amount of filler added (wt. %) | Exp. No. | composite system of resin A | | | | |
|---|---|---|---|---|---|---|---|
| | | | Izod impact strength | Heat distortion temp. | Tensile strength | Flexural strength | Flexural modulus |
| Blank | — | Comp. Example 3 | 100 | 100 | 100 | 100 | 100 |
| Brass | 58 | Example 3 | 72 | 114 | 163 | 148 | 306 |

TABLE 3-continued

| Kind of filler | Amount of filler added (wt. %) | Exp. No. | Izod impact strength | Heat distortion temp. | Tensile strength | Flexural strength | Flexural modulus |
|---|---|---|---|---|---|---|---|
| fiber Aluminum fiber | 48 | Example 4 | 96 | 120 | 144 | 143 | 355 |
| Aluminum flakes | 40 | Example 5 | 77 | 116 | 103 | 107 | 254 |

| | Amount of filler added (wt. %) | Composite system of ABS resin | | | | | |
|---|---|---|---|---|---|---|---|
| Kind of filler | | Exp. No. | Izod impact strength | Heat distortion temp. | Tensile strength | Flexural strength | Flexural modulus |
| Blank | — | Comp. Example 5 | 100 | 100 | 100 | 100 | 100 |
| Brass fiber | 58 | Comp. Example 4 | 26 | 114 | 135 | 128 | 297 |
| Aluminum fiber | 48 | Comp. Example 6 | 53 | 116 | 80 | 107 | 315 |
| Aluminum flakes | 40 | Comp. Example 7 | 37 | 116 | 57 | 89 | 231 |

Note:
The physical properties were represented by taking those of the blank base resin as 100.

The embodiments of the invention in which an exclusive property or privilege is claimed are defined as follows:

1. An electrically conductive, thermoplastic resin composition consisting essentially of a blend of (A) a copolymer consisting essentially of (1) units of vinyl aromatic monomer, (2) from 2 to 35% by weight, based on the weight of (A), of units of an unsaturated dicarboxylic acid anhydride monomer which is copolymerizable with said vinyl aromatic monomer, and (3) an elastomer, said copolymer (A) containing at least 50% by weight of said vinyl aromatic monomer (1), based on the sum of the weights of (1) and (3), and (B) particles of a metallic filler effective to impart electrical conductivity to said resin composition, said resin composition having been prepared by melt blending said copolymer (A) and said particles (B) in an extruder.

2. A resin composition as claimed in claim 1, in which said vinyl aromatic monomer is selected from the group consisting of styrene, alpha-methylstyrene and o-, m- and p-methylstyrene.

3. A resin composition as claimed in claim 1, in which said unsaturated dicarboxylic acid anhydride is selected from the group consisting of maleic anhydride and citraconic anhydride.

4. A resin composition as claimed in claim 1 in which said metallic filler particles are metal fibers flakes.

5. A resin composition as claimed in claim 1 in which said elastomer is polybutadiene.

6. A resin composition as claimed in claim 1 in which said vinyl aromatic monomer is styrene, said dicarboxylic acid anhydride is maleic anhydride and said elastomer is polybutadiene.

7. An electrically conductive, moldable, resin composition, consisting essentially of: a blend of (A) a styrene-maleic anhydride copolymer containing at least 50% by weight of styrene, (B) an acrylonitrile-butadiene-styrene copolymer and (C) particles of a metallic filler effective to impart electrical conductivity to said resin composition, said composition containing from 2 to 35% by weight of maleic anhydride, based on the sum of components (A) and (B), said resin composition having been prepared by melt blending said copolymer (A), said copolymer (B) and said particles (C) in an extruder.

8. An electrically conductive, moldable, resin composition, consisting essentially of: a blend of (A) a first resin component selected from the group consisting of styrene-maleic anhydride copolymer resin and rubber-reinforced high-impact styrene/maleic anhydride copolymer resin, said first resin component containing at least 50% by weight of styrene, (B) a second resin component selected from the group consisting of polystyrene resin, high-impact polystyrene resin and acrylonitrile-butadiene-styrene resin, and (C) particles of a metallic filler effective to impart electrical conductivity to said resin composition, said composition containing from 2 to 35% by weight of maleic anhydride units, based on the sum of components (A) and (B), said resin composition having been prepared by melt blending said components (A), (B) and (C) in an extruder.

9. A resin composition as claimed in claim 1, wherein said metallic filler particles are selected from the group consisting of iron, stainless steel, nickel, aluminum, copper and brass.

* * * * *

UNITED STATES PATENT AND TRADEMARK OFFICE
CERTIFICATE OF CORRECTION

PATENT NO. : 4 678 602

DATED : July 7, 1987

INVENTOR(S) : Kazunobu TANAKA et al

It is certified that error appears in the above-identified patent and that said Letters Patent is hereby corrected as shown below:

Column 7, line 49; before "flakes" insert ---or---.

Signed and Sealed this

Twenty-sixth Day of January, 1988

Attest:

DONALD J. QUIGG

*Attesting Officer*  *Commissioner of Patents and Trademarks*